June 5, 1956  H. A. TREBLER ET AL  2,749,302
COMBINATION SETTLING, FLOW DIVISION AND
WEIR TANK FOR WASTE DISPOSAL SYSTEMS
Filed July 31, 1953  2 Sheets-Sheet 1
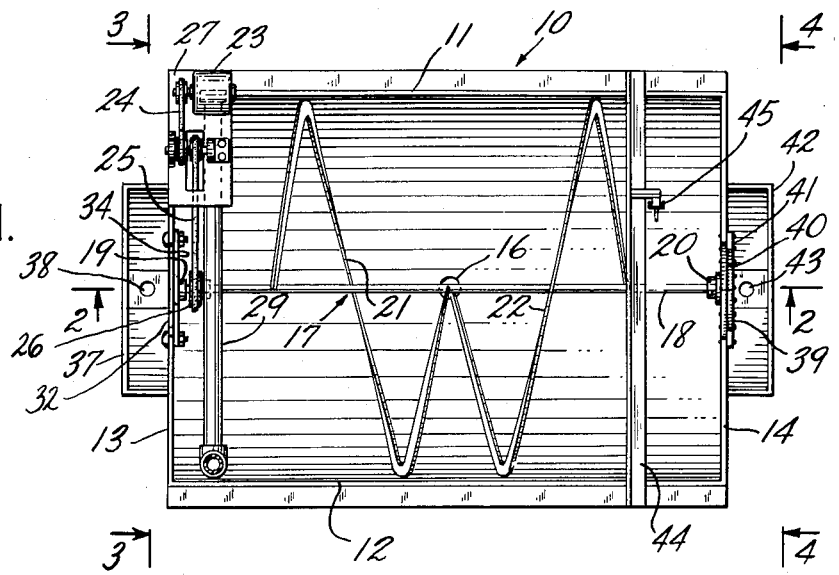
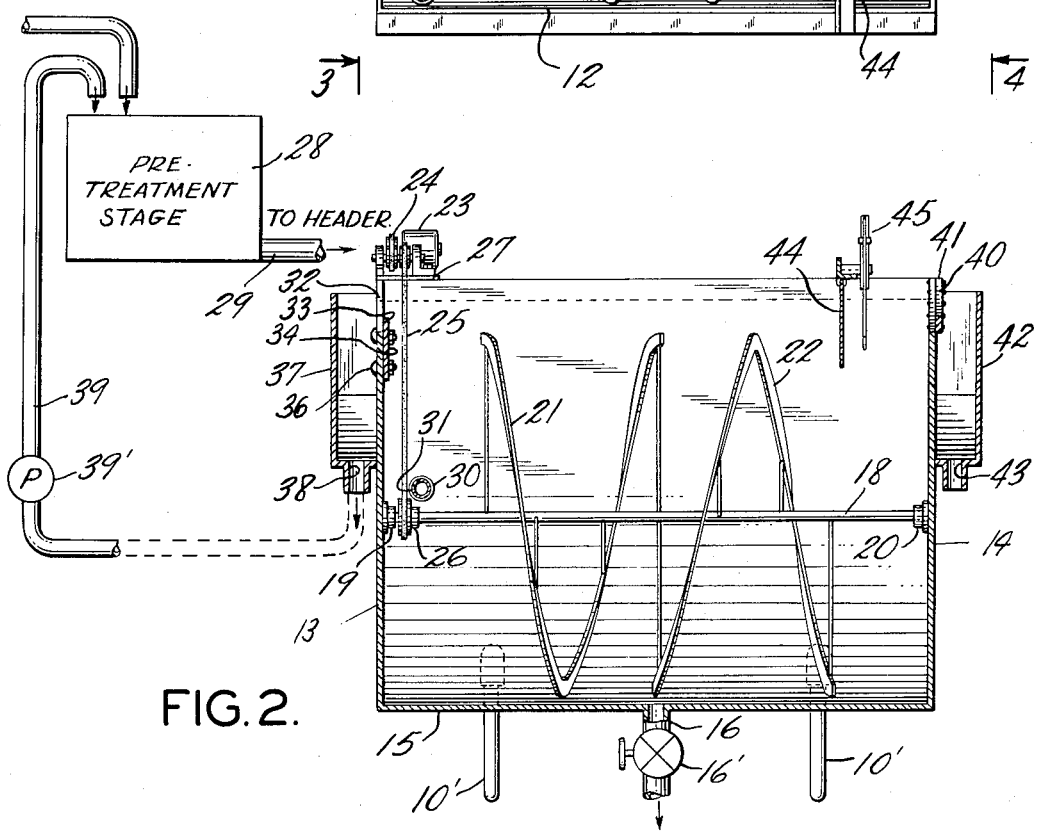
INVENTORS
HENNING A. TREBLER &
JOHN P. HORTON
BY
*Campbell, Brumbaugh, Free + Graves*
their ATTORNEYS INVENTORS
HENNING A. TREBLER &
JOHN P. HORTON
BY
Their ATTORNEYS

United States Patent Office 2,749,302
Patented June 5, 1956

2,749,302

COMBINATION SETTLING, FLOW DIVISION AND WEIR TANK FOR WASTE DISPOSAL SYSTEMS

Henning A. Trebler, Oakdale, and John P. Horton, Sayville, N. Y., assignors to National Dairy Research Laboratories, Inc., Oakdale, Islip, N. Y., a corporation of Delaware Application July 31, 1953, Serial No. 371,683

3 Claims. (Cl. 210—3)

This invention relates to waste disposal apparatus and more particularly to new and improved apparatus for disposing of liquid waste having solids suspended therein.

One of the essential steps in the operation of waste disposal plants is the sedimentation of solids suspended in a liquid, the sedimentation usually taking place after a biological processing operation in which micro organisms convert a large amount of the polluting material into new cellular or solid material. In a typical treatment operation approximately half of the pollutional load may be removed directly as gaseous decomposition products while the remaining half must be removed by separating the solids, consisting mostly of cellular material, from the remaining relatively pure water.

Settling tanks for separating the cellular solids have been constructed in the form of long rectangular tanks, vertical cylindrical tanks and square tanks, the latter being a compromise design between the cylindrical and rectangular varieties. A disadvantage of rectangular design is the relatively high cost per unit of tank volume, while a disadvantage of the round and square designs is that an essentially unstable liquid flow pattern obtains. Another disadvantage of all three of these tank designs is the difficulty encountered in removing settled solids from the bottom, the removal mechanism tending to be either expensive or inefficient.

Because waste under treatment must often be recirculated as many as one hundred times before it is finally discharged to the receiving stream, another design problem which must be faced is the control of the flow ratio of treated liquid to the stream and to the recirculating system. Still other design problems are imposed by the necessity for accurate measurement of the quantity of effluent liquid being discharged to the stream and of the polluting strength of this effluent, since often times, local governing agencies require data on the treated waste going to the stream. Essentially, therefore, the functions of settling, sludge collection and removal, flow division and flow sampling and measurement must be carried out as part of any complete sewage disposal operation and, because the conventional solutions to many of these problems tend to be incompatible, individual units each performing but a single function have been used in order that all operations might be carried out in a satisfactory manner.

It is, therefore, one object of this invention to provide an improved apparatus for use in sewage treatment operations.

Another object of the invention is to provide a unitary apparatus for carrying out, in the treatment of waste products, the plural operations of settling, sludge collection and removal, flow division, and flow sampling and measurement.

Another object of the invention is to provide an improved tank apparatus for the sedimentation of solids suspended in liquid waste products wherein a closely controlled ratio between effluent and recirculating liquids is obtained.

Still another object of the invention is to provide an improved settling tank structure affording stable flow patterns during the continuous treatment of liquid waste products.

These and other features and objects may be attained in accordance with the invention by means of a settling tank for receiving a continuous flow of liquefied waste products which is preferably rectangular at its upper regions and semi-cylindrical below. Liquid may be introduced into the tank by means of a header transversely disposed within the tank near the junction of the semicircular and rectangular portions and the settled solids may be removed by means of an outlet near the center of the semi-cylindrical bottom portion. These solids may be forced from either end of the tank toward the center by means of a rotary scraper closely fitted within the rounded bottom and having reversely pitched vanes on opposite sides of center. At the upper end of the tank near the inlet end there may be formed a rectangular weir having an adjustable lower lip and adapted to discharge into a discharge accumulating box the liquid which is to be recirculated into the system at a point ahead of the biological treatment unit.

A second weir may be formed at the opposite end of the tank near its upper end preferably in the form of a notch adapted to discharge into an accumulating box, the output of which may comprise the effluent to the stream. Disposed transversely of the tank near the second weir and partly below the liquid level of the tank is a baffle on which may be mounted a liquid level gauge for ascertaining the liquid level upstream of the second weir and hence the amount of flow through that weir.

The invention may be better understood by reference to the following specification taken in conjunction with the drawings, wherein:

Figure 1 is a top plan view of an apparatus formed in accordance with the present invention for use in the treatment of liquefied waste products;

Figure 2 is a side view in vertical section taken on the vertical plane through the line 2—2 of Figure 1 looking in the direction of the arrows and also showing in diagrammatic form a preliminary portion of a complete sewage treatment system and its relationship to the apparatus of this invention;

Figure 3:
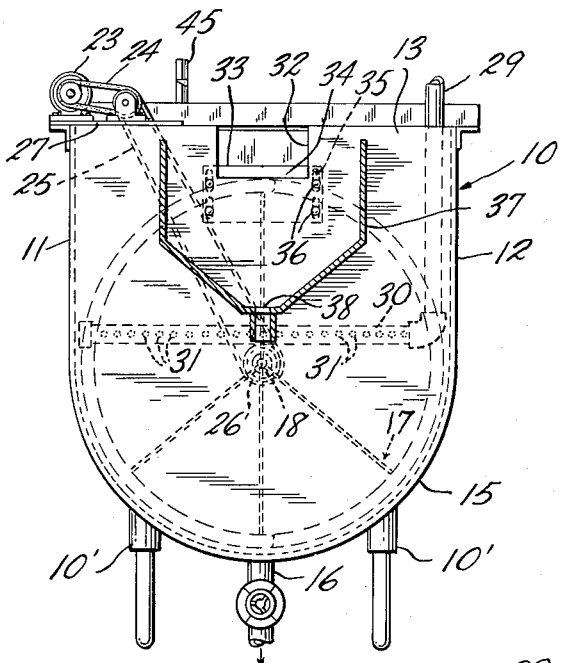
Figure 3 is an end view in vertical section taken on the plane through the line 3—3 of Figure 1 looking in the direction of the arrows.
Figure 4:
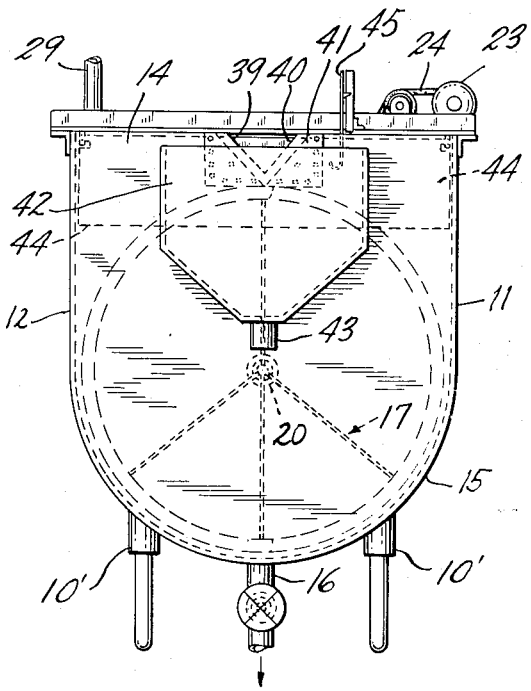
Figure 4 is a view taken in end elevation as viewed in the direction of the arrows 4—4 of Figure 1.

The invention is illustrated as embodied in a sewage treating tank 10 supported on legs 10' and having a rectangular upper portion bounded by parallel side walls 11 and 12 and parallel end walls 13 and 14. The tank 10 is formed with a semi-cyclindrical bottom portion 15 having a diameter the same as the width of the tank and having its axis aligned with the length of the tank. Formed in the semi-cylindrical bottom portion 15 near its center is an outlet 16 for sedimentary solids which accumulate on the bottom of the tank. A valve 16' may be provided in the outlet 16 to control the flow therethrough.

In order to move the solids from opposite ends of the tank toward the outlet 16 a rotary scraper 17 is provided including a center shaft 18 which is substantially coincident with the axis of the semi-cylindrical bottom portion 15 and journalled at its ends in bearings 19 and 20 carried by the end walls 13 and 14, respectively, of the tank. Carried by the rotor shaft 18, at opposite sides of the outlet 16 are helical scraper blades 21 and 22 oppositely pitched so that for a given direction of rotation sludge material will be urged gently from both ends of the tank toward the outlet 16 to be carried to a suitable repository. The rotary scraper 17 may be turned by a prime mover such, for example, as an electric gear head motor 23 coupled by belts or chains 24 and 25 to a pulley sprocket 26 affixed to the rotor shaft 18. The gearhead motor 23 may be mounted on a mounting plate 27 carried by the end and side plates 13 and 11, respectively, of the tank.

Liquid to be treated having its origin in a pretreating stage 28 of the waste disposal system, which may comprise, for example, an aerating apparatus or a biological processing apparatus, may be introduced into the tank 10 by means of conduit 29 and a horizontal, transversely disposed header 30 mounted in the tank near the left-hand end thereof as viewed in Figures 1 and 2 and disposed in the vicinity of the axis of the semi-cylindrical bottom portion 15. The header 30 may be formed with flow guiding means in the form, for example, of a row of openings 31 as best seen in Figure 3 opening toward the end wall 13, or in the form of an open ended pipe baffled to prevent unstable current patterns within the tank.

Formed in the end wall 13 at its upper edge is a rectangular weir 32, the lower lip 33 of which is vertically adjustable by means of a plate 34 formed with slots 35 which receive screws 36 threaded into the end wall 13. Carried by the end wall 13 beneath the rectangular weir 32 is a funnel-shaped collection box 37 having an outlet opening 38 at its lower end adapted to be connected by means of a recirculating conduit 39, which may include a pump 39', to a point in the treating system preceding the input to the tank 10, such for example as the pretreating stage 28. Formed in the end wall 14 is a weir 40 which may be in the form of a V incorporated in the weir plate 41 bolted or otherwise affixed to the end wall 14. Carried by the end wall 14 and disposed to receive the overflow from the weir 40 is a funnel-shaped collection box 42 having a discharge outlet 43 which may be connected to the public sewer or stream.

The side walls 11 and 12 of the tank 10 carry near the weir 40, a transversely disposed scum baffle 44 extending into the tank to a point beneath the liquid level. A hook gauge 45 may be mounted on the scum baffle 44 to measure the liquid level in the tank on the upstream side of the weir 40 and thus indicate by suitable calibrations the quantity of the flow through the weir 40.

In operation, solids will settle to the bottom of the tank to be urged gently toward the discharge outlet 16. Liquid at the upper left-hand end of the tank (as viewed in Figure 2) will flow through the weir 32 for recirculation through the sewage treatment system, while liquid at the upper right-hand end will flow through the weir 40 into the stream as the effluent. The amount of effluent flowing to the stream may be closely measured by means of the gauge 45 and a desired ratio between effluent and recirculating liquid may be achieved by adjusting the height of the weir 32. Solids discharged at the outlet 16 may be carried either to the sludge disposal unit or in part to a junction with incoming waste to act as seed for biological treatment.

Thus it will be understood that a single unit serves as a settling tank in which the solids settle to the bottom to be moved mechanically to a central outlet, as a flow division box by returning one portion of the flow for further treatment while passing another portion to the receiving stream as a clarified effluent, any remaining liquid being taken off with the settled sludge, and as a weir box and a sampling station inasmuch as the flow over the weir 40 may be determined by measuring the liquid flow in the tank upstream of the weir. Any suitable sampling device may be used for collecting samples between the baffle 44 and the weir 40 for laboratory analysis, a disclosure of a preferred form of such device being found in the U. S. patent to Trebler, No. 2,476,163.

In the event the pretreating stage 28 consists of aeration tanks, the location of the vertex of the weir 40 is preferably above the liquid level in the aeration tanks so that recirculating liquid and sludge can be returned by gravity to the aeration tanks.

While the invention has been described herein with reference to a preferred embodiment of the invention, it will be understood that various modifications or changes may be effected in accordance with the disclosure of the invention which should not, therefore, be regarded as limited except as defined by the following claims.

We claim:

1. In a system for the treatment of waste liquids containing suspended solids, a settling tank, outlet means adjacent the bottom of the tank to receive sedimentary solids and means to urge the solids toward said outlet, inflow means to introduce into the tank liquids containing suspended solids, a V-shaped weir at one end of the tank, a rectangular weir at the other end of the tank, said weirs being disposed to discharge liquid simultaneously over a range of common liquid levels in the tank, and recirculating means to receive the liquid passing out of the tank via the rectangular weir and to discharge said liquid back into the tank in a recirculating cycle.

2. A system for the treatment of waste liquids containing suspended solids comprising a tank having a rectangular upper portion defined by end and side walls and a semi-cylindrical bottom portion having its axis of curvature disposed parallel to the side walls and midway therebetween, an outlet centrally located in the bottom portion to receive sedimentary solids, a rotary scraper journalled in the tank on a horizontal axis substantially coincident with the axis of the semi-cylindrical bottom portion, counter-pitched blades carried by the scraper on opposite sides of center for movement close to the bottom portion to push solids from opposite ends of the tank toward the outlet, means to rotate the scraper, conduit means to introduce liquid containing suspended solids into the tank near one end thereof, a substantially rectangular weir at one end wall of the tank, a V-shaped weir at the other end wall of the tank, and means to adjust the relative heights of said weirs.

3. A system for the treatment of waste liquids containing suspended solids comprising a tank having a rectangular upper portion defined by end and side walls and a semi-cylindrical bottom portion having its axis of curvature disposed parallel to the side walls and midway therebetween, an outlet centrally located in the bottom portion to receive sedimentary solids, a rotary scraper journalled in the tank on a horizontal axis substantially coincident with the axis of the semi-cylindrical bottom portion, counter-pitched blades carried by the scraper on opposite sides of center for movement close to the bottom portion to push solids from opposite ends of the tank toward the outlet, means to rotate the scraper, a header for introducing liquid containing suspended solids into the tank, said header being horizontally and transversely disposed near one end of the tank and having perforations facing the near end wall for the discharge of liquids to be treated, a substantially rectangular weir at one end wall of the tank and having a lower lip disposed near the upper extremity of the orbit of rotation of the scraper, plate means to adjust the level of said lower lip, a first discharge collector to receive the overflow through the rectangular weir, conduit means to connect the first discharge collector to a point in the system preceding the tank to establish a recirculating circuit, a V-shaped weir at the other end wall of the tank, a collector to receive the overflow from the last named weir, said last named weir having its vertex disposed above the upper extremity of the orbit of rotation of the scraper, a scum baffle depending into the upper portion of the tank transversely thereof and near said other end of the tank, and means to measure the liquid level in the tank between the scum baffle and the V-shaped weir, whereby the liquid flow through the two weirs may be balanced and whereby the tank performs the plural function in the treating system of settling sedimentary solids and dividing liquid flow between the discharge and recirculating portions of the system.

References Cited in the file of this patent

UNITED STATES PATENTS

| Re. 19,146 | Tark | Apr. 24, 1934 |
| 955,077 | Janney | Apr. 12, 1910 |

FOREIGN PATENTS

| 405,314 | Great Britain | Feb. 2, 1934 |
| 60,819 | Norway | Dec. 7, 1937 |